US008626760B2

(12) United States Patent (10) Patent No.: US 8,626,760 B2
Pearce (45) Date of Patent: Jan. 7, 2014

(54) SYSTEM AND METHOD FOR DOCUMENT MANAGEMENT

(75) Inventor: Ronald D. Pearce, Pontiac, MI (US)

(73) Assignee: Gonzalez Technical Services, Inc., Madison Heights, MI (US)

( * ) Notice: Subject to any disclaimer, the term of this patent is extended or adjusted under 35 U.S.C. 154(b) by 204 days.

(21) Appl. No.: 12/543,038

(22) Filed: Aug. 18, 2009

(65) Prior Publication Data

US 2010/0114827 A1 May 6, 2010

Related U.S. Application Data

(60) Provisional application No. 61/089,572, filed on Aug. 18, 2008.

(51) Int. Cl.
*G06F 17/30* (2006.01)
(52) U.S. Cl.
USPC .......................................................... 707/736
(58) Field of Classification Search
USPC ........... 707/706, 811, 740, 999.101, 999.102, 707/736
See application file for complete search history.

(56) References Cited

U.S. PATENT DOCUMENTS

| | | | | |
|---|---|---|---|---|
| 5,708,826 A * | 1/1998 | Ikeda et al. | ................... | 715/209 |
| 5,819,062 A * | 10/1998 | Srikantappa | ................... | 716/102 |
| 6,088,625 A | 7/2000 | Kellstrom, Jr. | | |
| 6,600,476 B2 | 7/2003 | Mathis et al. | | |
| 6,622,149 B1 | 9/2003 | Kellstrom, Jr. | | |
| 6,901,400 B2 * | 5/2005 | Gillespie et al. | ....................... | 1/1 |
| 7,337,030 B2 * | 2/2008 | Thomas et al. | .................. | 700/98 |
| 7,765,505 B2 * | 7/2010 | Harashima et al. | ........... | 716/106 |
| 2002/0045963 A1 * | 4/2002 | Tenma et al. | .................... | 700/96 |
| 2002/0059243 A1 * | 5/2002 | Gillespie et al. | ................ | 707/10 |
| 2002/0095413 A1 * | 7/2002 | Meding et al. | ..................... | 707/9 |
| 2003/0144982 A1 * | 7/2003 | Reulein et al. | ..................... | 707/1 |
| 2004/0181374 A1 * | 9/2004 | Rappaport et al. | ................. | 703/1 |
| 2006/0000884 A1 * | 1/2006 | Menhardt et al. | ............. | 235/375 |
| 2006/0155407 A1 | 7/2006 | Azuma | | |
| 2006/0190116 A1 | 8/2006 | Almeida et al. | | |
| 2006/0230334 A1 * | 10/2006 | Slawson et al. | ............ | 715/500.1 |
| 2006/0267980 A1 * | 11/2006 | Onoue et al. | .................. | 345/420 |
| 2007/0179976 A1 * | 8/2007 | Arvin et al. | ................ | 707/104.1 |
| 2007/0260996 A1 * | 11/2007 | Jakobson | ....................... | 715/781 |
| 2008/0065625 A1 * | 3/2008 | Minami et al. | ..................... | 707/5 |
| 2008/0120070 A1 * | 5/2008 | Miller et al. | ...................... | 703/1 |

* cited by examiner

*Primary Examiner* — Hosain Alam
*Assistant Examiner* — Eliyah S Harper
(74) *Attorney, Agent, or Firm* — Gifford, Krass, Sprinkle, Anderson & Citkowski, P.C.; Thomas E. Anderson

(57) ABSTRACT

A system and method for document management in an industry where mass volumes of drawings are exchanged and worked upon is facilitated and streamlined. The system has a server in communication with a plurality of remote workstations. Each of the workstations includes a display and interface. The system standardizes the documents, and is operable to display the same document in each of the workstations. Thus, revisions by an authorized person may be made and seen by the other workstations. The system and method disclosed herein also ensures that drawings are delivered to the appropriate personnel as only authorized users may access the system, and eliminates the potential use of outdated drawings in planning as each drawing is automatically time and date stamped and placed in sequential order.

12 Claims, 9 Drawing Sheets

FIG. 2A

Open the Latest Print File

Project:
SO#:
Unit:

Projects
○ Active ● Assoc Prints ○ All ○ Open

[Zoom Entire] [Zoom +] [Zoom -]
[Rotate]

Description
C281 2008 DECKLID KIT
D369 2010 FENDER
D369 2010 HOOD KITS
D369 & D444 2008 FENDER KIT
D369 & D444 2008 HOOD NEW CELL
D496 2009 FENDER ASSY SYSTEM KIT
D496 2009 HOOD ASSY SYSTEM KIT
GM SPRINGHILL WLEDS 2009 2008/9 SRIN
GMT-672 SPRINGHILL W/GUNS 2008 WELD GUN
LORDSTOWN SPARE W/GUNS 2007 T103755 SP
ND 2006 HOOD TO BODY KIT
P221 2007 LINE #317 RELOCATE
P467 1 AND 4 XMBER 2005 WSP Plant Project
P467 Frt Door Closure Mfg 2008 P467 L-R FRT DO
P526 2009 TAILGATE
S197 Hood 2010 HOOD KIT
T00-1955-ZETA Compression 2007 ZETA COMP
Warranty 2007 WARRANTY 2007
Warranty 2006 2006 WARRANTY WORK 2006
Western Star 2005 CAB BUILD

FIG. 2B

Open the Latest Print File

Project: P467 Frt Door Closure Mfg 2008 P467 L-R FRT DOORS
SO#: 29539
Unit:

Projects
○ Active ● Assoc Prints ○ All ○ Open

[Zoom Entire] [Zoom +] [Zoom -]
[Rotate]

| SO | Description |
|---|---|
| 29528 | Sta#020-2E,M/H End Effector |
| 29529 | Sta#020-1W, Ped welder |
| 29530 | Sta#030-1N, Idle Nest |
| 29537 | Sta#060-1W2W, Ped Welder |
| 29541 | Sta#070-1w/2w, Ped Weld |
| 29542 | Sta#070-1N/2N, iDLE Nest |
| 29545 | Sta#080-1w/2w, Ped Welder |
| 29546 | Sta#080-1N/2N, Idle Nest |
| 29548 | Sta#090-1E, MH End Effector |
| 29549 | Sta#090-1W, Ped Welder |
| 29550 | Sta#200-T1, GEO Tooling |
| 29558 | Sta#090-1N, Idle Nest |
| 29561 | Sta#220-1E, MH End Effector |
| 29562 | Sta#220-1W, Ped Welder |
| 29563 | Sta#230-1N, Idle Nest |
| 29583 | Sta#330-1N, Idle Nest |
| 29586 | Sta#330-1E, MH End Effector |
| 29588 | Sta#340-1N, Idle Nest |
| 29590 | Sta#340-1E, MH End Effector |
| 29592 | Sta#350-1N, Idle Nest |
| 29594 | Sta#350-1E, MH End Effector |
| 29595 | Sta#350-1W, Ped Welder |

SYSTEM AND METHOD FOR DOCUMENT MANAGEMENT

CROSS REFERENCE TO RELATED APPLICATION

This application claims priority of U.S. Provisional Patent Application Ser. No. 61/089,572 filed Aug. 18, 2008, which is incorporated herein by reference.

FIELD OF THE INVENTION

The present invention is related to system and method for document management and in particular to a system and method for document management having a plurality of work stations in communication with each other so as to allow for simultaneous collaboration in the design of a part.

BACKGROUND OF THE INVENTION

Document management has become an extremely valuable tool for saving resources. Specifically, document management reduces the amount of money spent on paper and the amount of time spent organizing, updating, and sorting. Document management becomes even more important in industries where the production of documents is high because proper document management can bring down costs, save time, and save resources.

The automotive industry, building construction industry, and the like are typical examples of high document production industries in need of efficient document management. In the automotive industry a supplier often works side by side with the automobile manufacturer to ensure that the supplies and the parts provided comply with the remaining specifications of the manufactured vehicle. For instance, the supplier providing the parts for a fender works closely with the automobile manufacturer to assure that the fender is in compliance with adjoining parts such as the side panels or the front hood. Other associated parts may be provided by a different supplier thus making the collaborative process time consuming as representatives from different suppliers must know the specifications of adjoining parts to ensure that the part provided fits. In most instances, the parts are represented to the manufacturer by use of a diagram or drawing showing the dimensions of the parts and the interrelation between the proposed parts and remaining vehicle body. Thus, one part change can have an effect on various other vehicle parts and requires other suppliers to make changes to their part. These changes can also come due to the manufacturer's need or desire to make aesthetic changes or structural changes to support weight and load compliance to meet either federal regulations or the manufacturer's own standards. Thus, it is not uncommon that a part may be represented hundreds of times in various different drawings due to different changes that the manufacturer desires to make. This process can be exhaustive and wasteful, where hundreds of paper drawings are reviewed, produced, and then later discarded.

The flow of documents in such a process can also hinder industry production, especially when drawings for a manufactured part need to be delivered to a specific site so as to provide the workers with the necessary drawings to complete a project. Delivering such documents can be a very costly procedure as the documents tend to be drawn on large pieces of paper and there tends to be hundreds of documents showing various perspectives of the same part. In certain instances, the delivery cost is paid at a premium, such as when the documents need to be delivered overnight in order to meet production demands or to maintain a production schedule.

Furthermore, as natural resources begin to dwindle and as the collective conscious of global warming and environmental stewardship begins to take hold in society, it is preferable to provide a system whereby the reduction of document production can occur without hindering the collaborative design process between a supplier and a manufacturer. Accordingly, a system and method is hereby provided that can manage the production of documents while at the same time facilitate the collaborative process.

Currently, a designer prints the drawings and retrieves the drawings from the printer and then releases said drawings to the vendor. The designer then takes the drawings to the project manager and if the vendor is offsite will have to deliver the drawings to the offsite vendor location. The prints are then obtained offsite, and the offsite vendor will begin to identify and categorize the drawing by first placing a time date stamp on the drawing to make certain that the drawing's status within the process is identified. This process allows revisions to the drawing to be known and therefore helps ensure that manufacturers and suppliers do not rely upon outdated drawings when manufacturing a part. Usually these drawings require additional copies to be made and distributed to the various personnel associated with a design team. These drawings are then worked on by the various individuals and then brought together once more for a final review. One master copy of the drawing is then made to reflect the various changes. As easily seen, the current document management method and system creates potential for error, especially when a final document does not incorporate all of the designs made by various design personnel.

The delivery of drawings in high drawing production industries such as the automotive industry may include numerous steps. With reference to FIG. 4, a prior art method of drawing delivery in the automotive industry is shown. In the prior art, the automotive industry uses sixteen steps for drawing delivery. These steps were necessary to ensure the security of the drawings, track the drawings so as to verify the status of the drawing, disseminate the drawings to authorized personnel, and ensure that only authorized personnel made the changes. Accordingly, as shown in the prior art of FIG. 4, many checks were implemented and as a result the steps became numerous and encumbered the collaborative process. Furthermore, in many instances a part drawing is worked upon by different people in different locations, thus the part drawing needed to be provided to the different people and therefore the process consumed a lot of paper.

Furthermore, the drawings may be formatted in any one of a number of different applications. For instance, the drawings may be provided in CAD, CATIA, jpg, or the like. Thus, in order to view all of the drawings, the necessary viewing application is needed. This may be quite expensive as the cost of licensing such applications may be high. Furthermore, depending on the computer, loading all of the necessary applications may burden and slow the processing speed of the computers. Thus, it remains desirable to have a system that may view drawings in any format and allow users to make changes to those drawings.

SUMMARY OF THE INVENTION AND ADVANTAGES

A system for document management having a server in communication with a database storing documents is provided. The documents may be formatted in any one of a plurality of applications. The system includes a document viewing processor operable to process each of the documents and display them in a predetermined format. The system also includes a plurality of workstations in communication with each other and the server. Each of the plurality of workstations has a processor, an interface, and a display. The interface is operable to selectively choose one of the plurality of documents and make revisions to the selected document.

The system further includes a collaborative facilitating processor and an authorization processor. The collaborative facilitating processor is in communication with the server. The collaborative facilitating processor is also in communication with the interface located at each of the plurality of workstations so as to process the signal from each interface and record and actuate revisions made to the selected document. The collaborative facilitating processor is also in communication with the server. The server displays the revisions to each of the workstations so that all personnel collaborating during the design process is made aware of the revisions.

The authorization processor is in communication with the collaborative facilitating processor. The authorization processor is operable to selectively accept any design changes so as to prevent unauthorized changes in the selected document. The revised document is then stored in the database.

BRIEF DESCRIPTION OF THE DRAWINGS

FIG. 2a is an illustration of a webpage of the web-based document management system showing different projects filed in the database;
FIG. 2b is an illustration of a webpage of the web-based document management system showing the different parts of a particular project, the parts are filed in the sub-database.

DETAILED DESCRIPTION OF THE INVENTION

Figure 1:
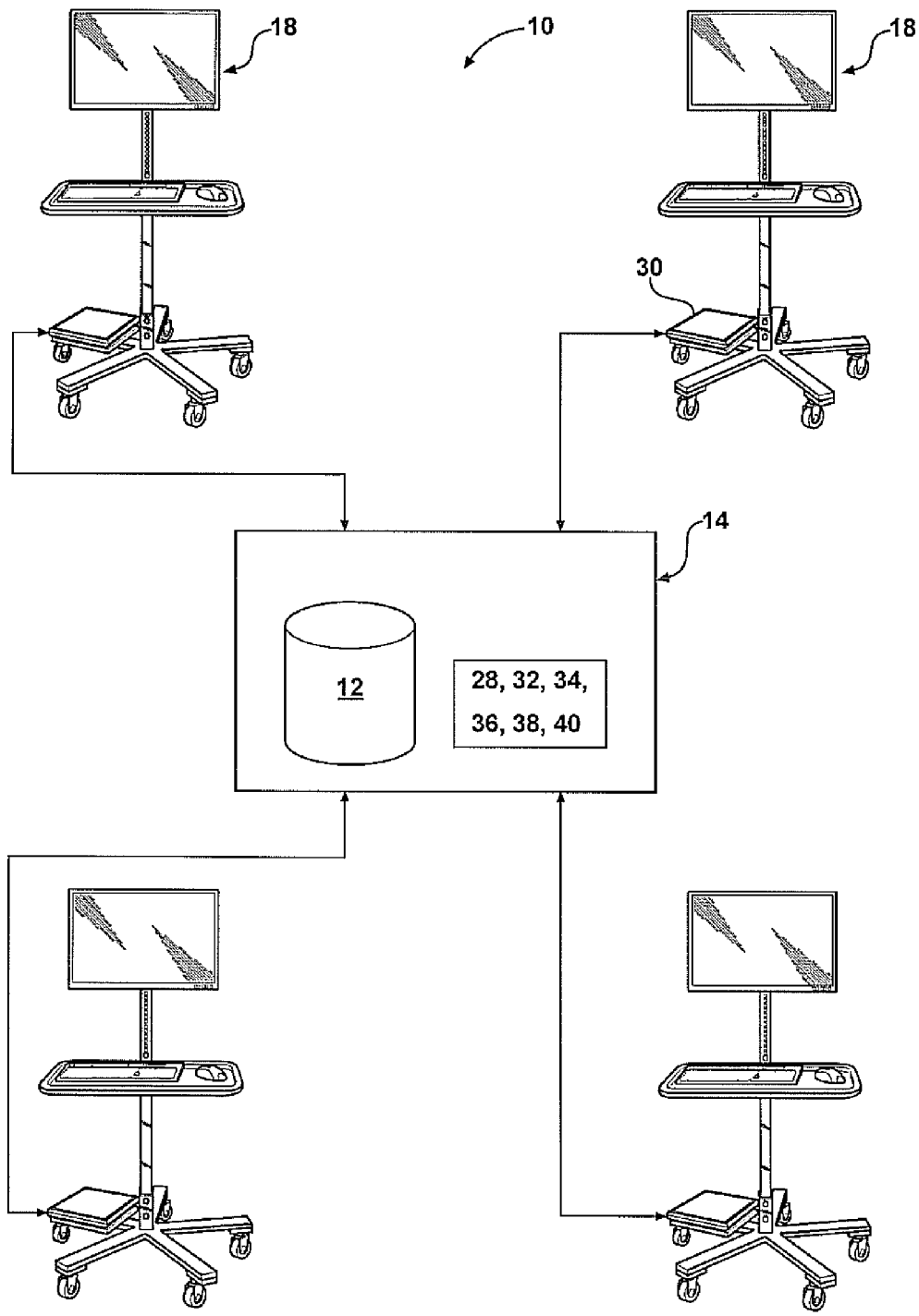
FIG. 1 is a diagram of the system.

With reference to FIG. 1, a system 10 for document management having a database 12 in communication with a server 14 is provided. Preferably, the server 14 is web-based and in communication with a plurality of off-site or otherwise remote computer processing units. The server 14 executes a software application 16 to create a website to perform document management. Preferably, each of the computer processing units is housed in a workstation 18. The workstation 18 includes a visual display 20 and an interface 22 allowing offsite users to access various documents and to collaborate with other users in remote locations so as to make real time changes to the drawings. The website contains many features directed towards facilitating the management of documents, including real time and simultaneous editing of documents, automatic time and date stamp of documents, and storing and categorization of documents.

Figure 1A:
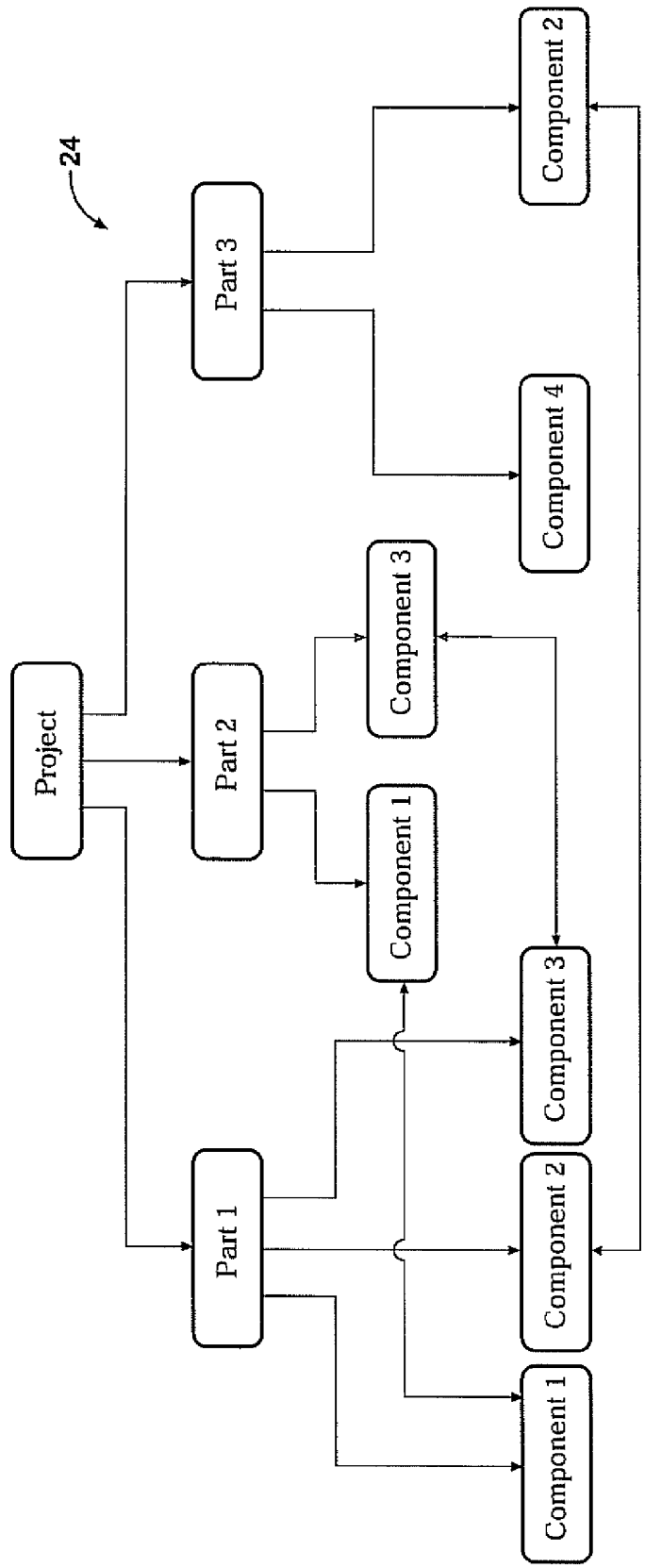
FIG. 1a is a diagram showing the hierarchical structure of the database.
Figure 2C:
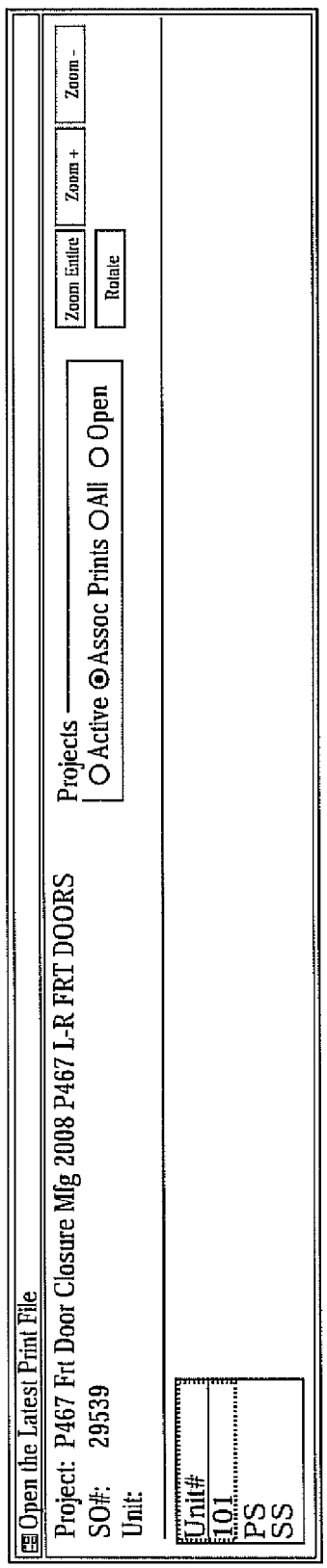
FIG. 2c is an illustration of a webpage of the web-based document management system showing the different components of a particular part.
Figure 2D:
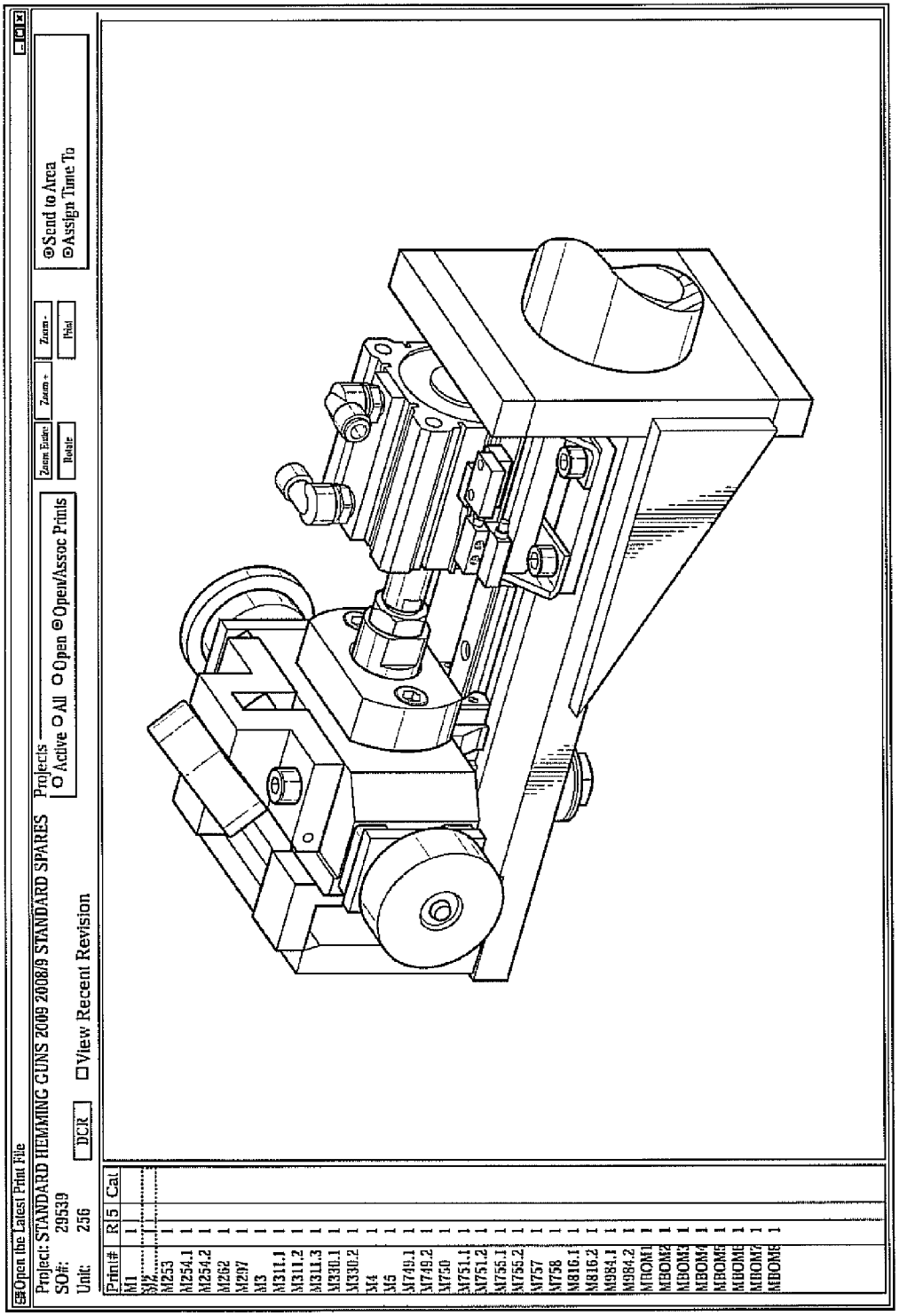
FIG. 2d is an illustration of a webpage of the web-based document management system showing a selected drawing for the component of FIG. 2c.

With reference now to FIG. 1a, the database 12 is organized in a hierarchical structure 24. The hierarchical structure 24 has a plurality of sub-databases 26. Each sub-database 26 stores a predetermined group of documents so as to organize the documents by a category of information. Each of the sub-databases 26 may be labeled with a predetermined label. For instance, one sub-database 26 may be related to a particular type of document, while yet another of the predetermined group of documents may be related to the originator of the document. Another category of sub-databases 26 may be related to various offsite locations. Yet another category of sub-databases 26 may be related to the identification of personnel and further yet, another sub-database 26 may be related to the various access levels provided for each identified personnel or for each of the said offsite locations. The entry (information or documents) within each of the sub-databases 26 may be further divided and sorted into subcategories. Each entry is tagged with a value, so as to allow the server 14 to search for a particular document using known techniques such as data mining.

The system 10 further includes a document viewing processor 28. The document viewing processor 28 is in communication with the server 14 and display 20. The document viewing processor 28 is operable to process the documents so as to display 20 the document on the display 20. For instance, the document viewing processor 28 may convert a drawing in a format such as CAD or CATIA into a tiff format so as to allow users with CAD or CATIA software to view the drawings. The server 14 automatically actuates the document viewing processor 28 when any one of the documents is selected by the user. The document viewing processor 28 is further operable to format each of the documents so as to convert the document to fit onto a predetermined sheet. For instance, the document viewing processor 28 may convert a drawing completed on an 8.5"×11" page to an 11"×17" page.

The database 12 is accessible by and in communication with the server 14. The server 14 executes a software program, whereby a web-based application 16 is provided. The web-based application 16 is interactive and in communication with each of the workstations 18. The web-based application 16 actuates a document organizing processor 30 operable to organize the inputted documents and stored documents. For example, the document organizing processor 30 may store and organize the documents every time after a document is amended by authorized personnel located at any one of the workstations 18.

The document organizing processor 30 is in communication with the database 12. Each document may contain metadata to facilitate the retrieval and search of documents. Additionally, the document organizing processor 30 may process the database 12 so as to organize the documents by title. For example, documents may be categorized by projects, and each project may be supported by numerous documents. Each project may be associated with a sub-database 26 of the hierarchical structure 24. Preferably, the documents are listed sequentially by the earliest revision date so as to provide the user with visual reference of which of the documents contain the most current revisions.

The system 10 includes a collaborative facilitating processor 32 and an authorization processor 34. The collaborative facilitating processor 32 is also in communication with the interface 22, display 20, and the server 14. The collaborative facilitating processor 32 is operable to receive input from each of the workstations 18 so as to display 20 a change made on one workstation 18 to each of the other workstations 18 in real time. In one embodiment, the authorization processor 34 is automatically actuated once changes are made, and the user closes the revised document.

The authorization processor 34 processes the database 12 so as to determine who is authorized to make revisions to the document. The authorization processor 34 requests the identification of the person making the revisions and processes the database 12 to determine if the person is authorized to make changes. The authorization processor 34 may further request a password. Upon receiving the identification of an authorized person and the password, the revised changes are stored in the database 12. More particularly, the document organizing processor 30 stores the document in the appropriate sub-database 26.

The system 10 may further include a date stamping processor 36. The date stamping processor 36 is actuated when the document is being closed. The date stamping processor 36 is in communication with the authorization processor 34. As the document is being closed, and before being processed by the document organizing processor 30, the date stamping processor 36 identifies the date and time the revision was made, and who made the revision. The document organizing processor 30 is further operable to store the documents according to the latest revision, or the person who made the revision.

The system 10 may further include a notification processor 38. The notification processor 38 is in communication with the database 12, and is operable to process the database 12 so as to detect any revisions made to any one of the plurality of documents. The notification processor 38 is also in communication with authorization processor 34 so as to all personnel authorized to make changes to a particular drawing that a change has been made.

As stated above, the web-based system 10 may be displayed on an offsite computer processing unit/workstation 18. The workstation 18 includes an interface 22, such as a mouse, keyboard, touch screen or the like. The interface 22 is operable to allow each authorized user to collaborate in the design process. The web-based application 16 includes a messaging application 16 whereby authorized users can communicate to each other while simultaneously viewing the same document in real time, similar to current instant messaging programs. Thus, every designer or engineer involved in the design of a particular part is able to discuss and identify the aspects of the drawing that are of concern and understand the specific revisions that were made to each drawing and why those revisions were made to each drawing in real time. Any messaging application 16 currently known and used in the art is adaptable for use herein, illustratively including video conferencing, digital voice communications, and the like.

Thus the system 10 is very helpful for collaboration as it allows the manufacturer to understand what the design process entailed and gives the manufacturer a better understanding of the considerations that were given to effect a certain change. For instance, if a part is not in compliance with the manufacturer's specifications, the manufacturer is able to look through the sequentially ordered drawings stored in the database 12 to determine how and why the vendor made certain changes. Thus the manufacturer is given a basis for which to approve of or reject the change. Furthermore, the system 10 eliminates the need for vendors and manufacturers to deliver paper documents in support of each revised drawing. Furthermore, paper documents are standardized to ensure that the views of the drawings as seen on the workstations 18 are consistent with each offsite location.

With reference now to FIGS. 2a-2d, a preferred embodiment of the system 10 is provided. In the preferred embodiment, the system 10 is configured for documents having design drawings, referred to herein simply as "drawings." The drawings support various projects, such as a fender or front grille for an automotive vehicle. Each of the projects may contain subparts, and each of the subparts may be further contained in a corresponding sub-database 26. The hierarchical structure 24 allows the system 10 to identify common parts or sub-parts and store the common subparts in corresponding sub-databases 26. Thus, a bracket which may be used for both a fender and a front grille may be found in each of the corresponding sub-databases 26 relating to the fender and front grille.

These drawings may be further subdivided into parts related to the project and then placed in order, such as sequentially by parts, so as to represent the most current updated drawing. Other entries such as the project leader or the site location of the project members may be stored so as to facilitate the project collaboration between different users.

The interface 22 is operable to selectively choose a drawing. In instances where multiple workstations 18 are collaborating to make design changes to a particular part, the part may be displayed at each of the workstations 18. Upon selection of the drawing, the document viewing processor 28 converts the drawing into the same standard format so that the display 20 of each workstation 18 displays 20 the same drawing. Preferably, the drawings are all converted to a "tiff" file and reconfigured to fit onto an 11"×17" page.

The collaborative facilitating processor 32 is in communication with the server 14 and each of the workstations 18. More specifically, the collaborative facilitating processor 32 is in communication with each interface 22 and display 20. The collaborative facilitating processor 32 receives input from each interface 22 so as to display 20 a change made on one workstation 18 to each of the other workstations 18 in real time. When the users at each of the workstations 18 agree to the revisions, the user closes the revised document and the authorization processor 34 is automatically actuated.

The authorization processor 34 processes the database 12 so as to determine who is authorized to make revisions to the document. The authorization processor 34 requests the identification of the person making the revisions. The authorization processor 34 may further request a password. Upon receiving the identification of an authorized person and the password, the revised changes are stored in the database 12. More particularly, the document organizing processor 30 stores the document in the appropriate sub-database 26. The date stamping processor 36 identifies the date and time the revision was made and who made the revisions. The document organizing processor 30 may then store the documents according to the latest revisions or the person who made the revisions.

Accordingly, a user may access the web-based system 10 and determine for each various part drawings of a particular project which of the part drawings represents the original drawings, which of the part drawings is the most current revised drawing, who is responsible for a particular amendment, and the personnel authorized to make an amendment. Through the sequential ordering of the drawing, a user is able to determine the design process and understand the reasons why certain changes were made. Thus, the proposed system 10 helps eliminate the possibility of the wrong drawing being relied upon when making a change to a part and facilitates the collaborative work process by providing pertinent information to the user.

The web-based system 10 also includes a searching processor 40 operable to search the database 12 for a desired part or drawing. The searching processor 40 may be in communication with the authorization processor 34, whereby only authorized users can search the database 12 for specific parts, personnel, and the like. The web-based system 10's searching processor 40 may utilize tags 42 associated with each drawing. The tags 42 provide information relating the corresponding drawing. For instance the tag 42 may indicate who the originator of the drawing is, thereby ensuring that only the originator or authorized personnel can make changes to the parts. This makes certain that personnel having access to the drawings do not make errant marks or changes which have not been approved by appropriate personnel.

The system 10 may further include a drawing specification database 12 containing the specifications for each drawing part. The authorization processor 34 is further operable to process the specification database 12 so as to ensure that each revision made to a particular part does not violate the specifications for the part. Additionally, the authorization processor 34 is operable to process the other parts to ensure that the revisions, though made within specification of the revised part, do not cause the project to fall outside of the project specification.

Figure 3:
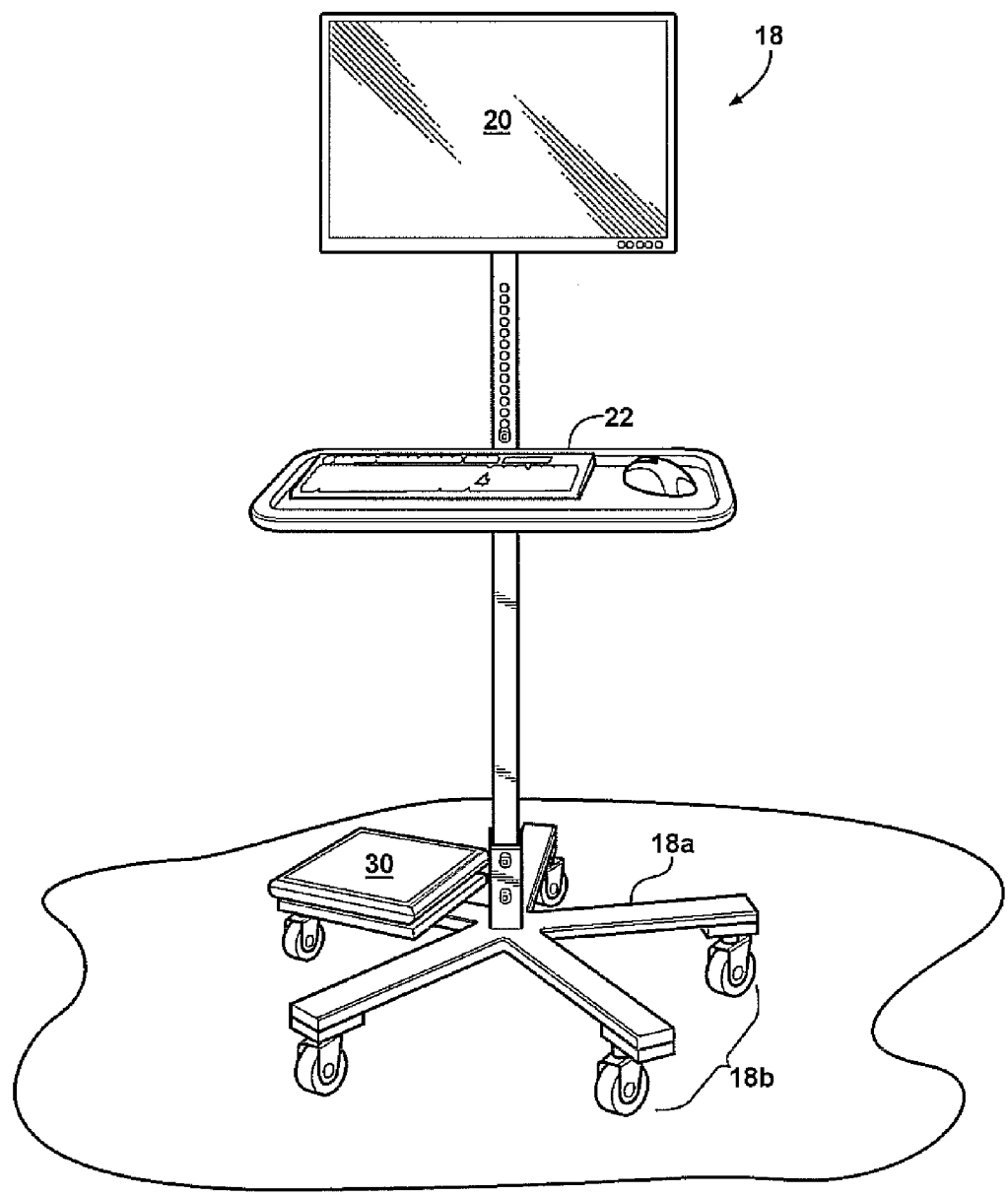
FIG. 3 is an illustration of a workstation.
Figure 4A:
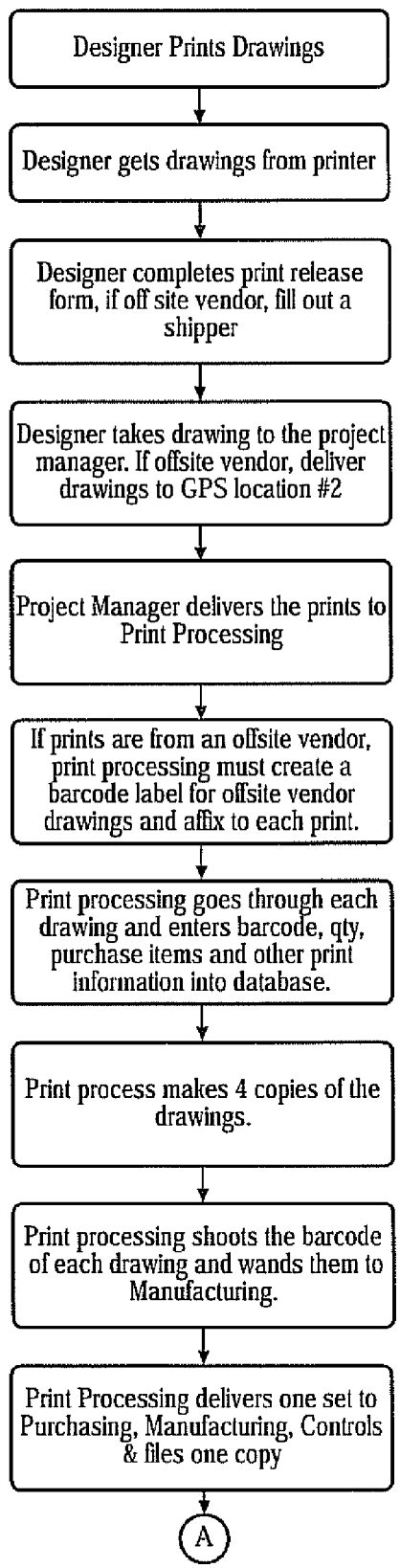
FIG. 4 is a diagram showing the prior art method of document management.

With reference now to FIG. 3, an illustration of a workstation 18 is provided. Preferably, the workstation 18 is mobile. Thus the workstation 18 is in communication with the server 14 wirelessly, thereby allowing the workstation 18 to move within the offsite location to better support the collaborative process. For instance, if the workstation 18 is disposed within a manufacturing plant and there is a particular part or drawing which requires referencing, the workstation 18 can be moved to that particular part and the design team will be able to look at the actual physical part and the drawings when making a recommendation.

The remote workstation 18 includes a base 18a having a plurality of rollers 18b so as to facilitate the movement of the workstation 18 to different areas of the workstation 18 site. The workstation 18 includes a processor 30, an interface 22, and a display 20. The processor 30 may be powered by a mobile battery pack, or may be plugged into a standard electrical plug. The interface 22 includes a keyboard and a mouse, operable to communicate changes in drawings to the server 14. The remote workstation 18 may be rolled to different areas of the design location, where comparison between the drawings and the actual part may be made. Thus, mobile feature of the workstation 18 facilitates the collaboration of the design process.

Figure 5:
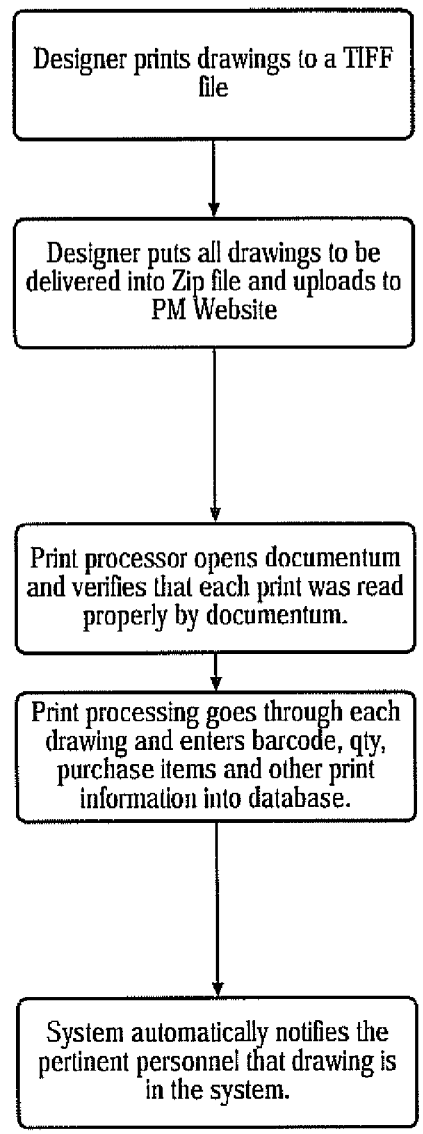
FIG. 5 is a diagram showing the method of document management provided herein.
Figure 4B:
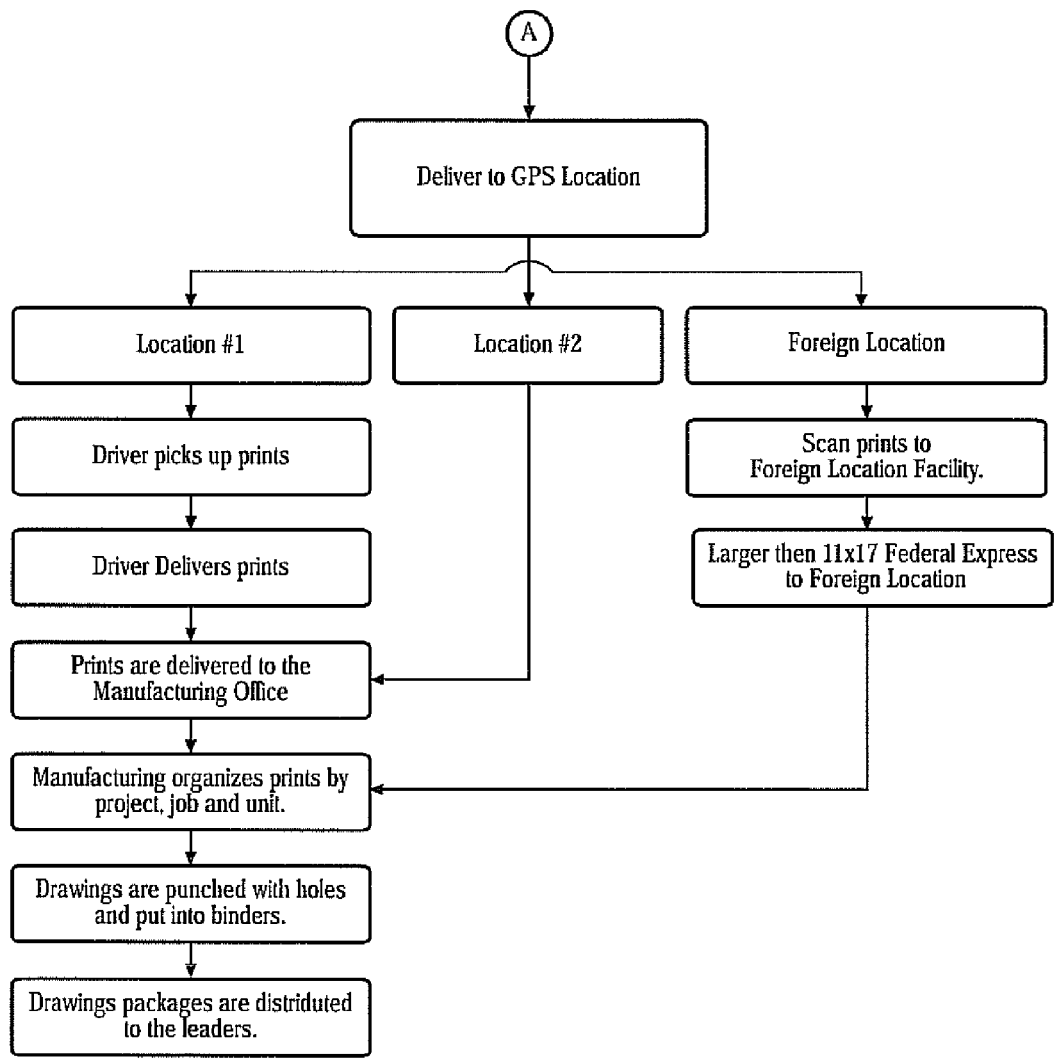

With reference now to FIG. 5, a method 44 of managing drawings utilizing a web-based system 10 is provided. The method 44 delivers drawings in electronic form from any location within a predefined network. The method 44 comprises the steps of: creating the drawing; standardizing the drawing forms; uploading the standardized drawings into a database 12; sorting each drawing and storing the drawings into predetermined sub-databases 26; providing a server 14 that executes a software application 16, wherein the software application 16 further organizes and sorts the drawings into various categories within each sub-database 26; identifying all the users and providing authorized users with an access; identifying all the remote sites; supplying the drawings to authorized users; and providing a display 20 at each of the workstations 18, wherein the display 20 is operable to display 20 a selected drawing so as to allow users to collectively view the same drawing from remote offsite locations. The method 44 also includes the step of restricting communication and collaboration on a particular drawing to only authorized users, wherein the authorized users may communicate in real time with each other while viewing the same drawing. The method 44 also includes the step of tagging each drawing to ensure that the date and time of creation or revision is documented.

Thus provided is a system 10 and method 44 whereby drawing management in an industry where mass volumes of drawings are exchanged and worked upon is facilitated and streamlined. Specifically, the need to reproduce in a hard copy a drawing to support the collaborative process and refinement of a part is eliminated. Furthermore, the system 10 and method 44 delivers drawings by electronic means and therefore expedites the work flow as the need for delivering hard (paper) copies is eliminated. Furthermore, the document management system 10 enables the delivery of drawings from any location that has a workstation 18 equipped to communicate with the server 14. The system 10 and method 44 disclosed herein also ensures that drawings are delivered to the appropriate personnel as only authorized users may access the system 10. The system 10 and method 44 disclosed herein also eliminates the potential use of outdated drawings in planning as each drawing is automatically time and date stamped and placed in sequential order.

Obviously, many modifications and variations of the present invention are possible in light of the above teachings and may be practiced otherwise than as specifically described while within the scope of the appended claims.

I claim:

1. A system for managing and tracking documents having drawings, the system comprising:

a server in communication with a database, the database storing a plurality of drawings in an electronic format wherein each of the plurality of drawings is a design drawing associated with a unique serial revision identification number, original author and is formatted in one of a plurality of files selected from the group consisting of CAD, CATIA, jpg, and GIF;

a drawing viewing processor in communication with the server, the drawing viewing processor operable to process in real time the format of each drawing and convert the format of each of the drawings so as to display the drawing in a predetermined format, wherein the predetermined format includes a predetermined file type and dimension;

a plurality of workstations in communication with each other and the server, each of the plurality of workstations including a processor, an interface, and a display, wherein the interface is operable to selectively choose one of the plurality of drawings and an operator is operable to actuate the interface to make changes to the drawings to include adding additional structure to the drawings, and wherein the drawing viewing processor is operable to process in real-time the selected drawing so as to display in real-time the selected drawing on the display;

a collaborative facilitating processor in communication with the interface and the server, the collaborative facilitating processor operable to allow multiple users located remotely from each other access to the selected drawing, the collaborative facilitating processor operable to allow remote collaboration, viewing, editing and discussion of the selected drawing in real time, process in real time the interface from each of the plurality of workstations so as to record and actuate in real time design changes onto the selected drawing and updating in real time the selected drawing with a new, unique serial revision identification number and drawing editor if the drawing editor differs from the original author or previous selected drawing editor, wherein the collaborative facilitating processor is also in communication with the server; and an authorization processor in communication with the collaborative facilitating processor, the authorization processor operable to selectively accept in real-time any design changes so as to prevent unauthorized changes in the selected drawing, wherein when authorized changes are actuated by an authorized editor, the authorization processor communicates with the collaborative facilitating processor to create the unique serial revision identification number dependent on a current revision number, a last authorized editor and date for identifying the selected drawing.

2. The system as set forth in claim 1, wherein the file type of the predetermined format is a tiff format, and the predefined dimension of the predetermined format is 11'×17' page.

3. The system as set forth in claim 2, wherein the database includes a hierarchical structure, the hierarchical structure having a plurality of sub-databases wherein each of the plurality of drawings is stored in at least one of the plurality of sub-databases.

4. The system as set forth in claim 3, further including a drawing organizing processor, the drawing organizing processor operable to organize revised, created, and stored drawings, so as to place each of the drawings in a corresponding sub-database.

5. The system as set forth in claim 2, wherein the drawing viewing processor is further operable to format each of the plurality of drawings so as to convert each of the plurality of drawings to fit onto a predetermined sheet.

6. The system as set forth in claim 5, further including a drawing specification database in communication with the collaborative facilitating processor, the drawing specification database having specifications for each of the plurality of drawings, the drawing specification database operable to process a selected drawing so as to identify changes made to the selected drawing which are not within the specifications for the drawing.

7. The system as set forth in claim 2, further including a searching processor in communication with the server and the interface, wherein the searching processor is operable to search the database so as to identify and locate the selected drawing.

8. The system as set forth in claim 2 wherein the plurality of workstations and the server are in wireless communication with each other.

9. The system as set forth in claim 2, further including a notification processor, the notification processor in communication with the database, wherein the notification processor is operable to process the database so as to detect any revisions made to any one of the plurality of drawings, and wherein the notification processor is also in communication with the authorization processor so as to provide notice to all personnel authorized to make a change to the drawing that a change has been made.

10. The system as set forth in claim 2, further including a searching processor operable to search the database for a desired drawing, wherein the searching processor is in communication with the authorization processor, and wherein the authorization processor is operable to process a search so as to allow only authorized users to actuate the searching processor.

11. The system as set forth in claim 10, further including a plurality of tags, wherein each of the drawings is associated with at least one of the plurality of tags, the tags providing information relating to the corresponding drawing.

12. The system as set forth in claim 2, further including a date stamping processor in communication with the collaborative facilitating processor, the date stamping processor operable to identify a date of each change in the selected drawing accepted by the authorization processor.

\* \* \* \* \*